United States Patent
Yost

(10) Patent No.: US 9,062,654 B2
(45) Date of Patent: Jun. 23, 2015

(54) MODULAR MICRO WIND TURBINE

(75) Inventor: Robert D. Yost, Harvest, AL (US)

(73) Assignee: American Wind Technologies, Inc., Harvest, AL (US)

( * ) Notice: Subject to any disclaimer, the term of this patent is extended or adjusted under 35 U.S.C. 154(b) by 528 days.

(21) Appl. No.: 13/430,243

(22) Filed: Mar. 26, 2012

(65) Prior Publication Data
US 2013/0249217 A1 Sep. 26, 2013

(51) Int. Cl.
*F03D 9/00* (2006.01)
*F03D 1/04* (2006.01)

(52) U.S. Cl.
CPC ............. *F03D 1/04* (2013.01); *F05B 2220/00* (2013.01); *F05B 2220/50* (2013.01); *F05B 2240/40* (2013.01); *F05B 2250/82* (2013.01); *Y02B 10/30* (2013.01); *Y02B 10/70* (2013.01); *Y02E 10/725* (2013.01)

(58) Field of Classification Search
USPC ...................................... 290/44, 55
See application file for complete search history.

(56) References Cited

U.S. PATENT DOCUMENTS

| | | | |
|---|---|---|---|
| 710,277 A | 9/1902 | Kaiser | |
| 2,563,279 A | 8/1951 | Rushing | |
| 3,902,072 A | 8/1975 | Quinn | |
| 4,021,135 A | 5/1977 | Pedersen et al. | |
| 4,201,514 A | 5/1980 | Huetter | |
| 4,218,175 A | 8/1980 | Carpenter | |
| 4,285,481 A | 8/1981 | Biscomb | |
| 4,362,470 A | 12/1982 | Locastro et al. | |
| 4,456,429 A | 6/1984 | Kelland | |
| 4,632,637 A | 12/1986 | Traudt | |
| 5,183,383 A | 2/1993 | Baas | |
| 5,315,159 A | 5/1994 | Gribanu | |
| 5,457,346 A * | 10/1995 | Blumberg et al. | 290/55 |
| 5,474,425 A | 12/1995 | Lawlor | |
| 6,278,197 B1 | 8/2001 | Appa | |
| 7,218,011 B2 * | 5/2007 | Hiel et al. | 290/43 |
| 7,315,093 B2 | 1/2008 | Graham, Sr. | |
| 7,344,353 B2 | 3/2008 | Naskali et al. | |
| 7,352,076 B1 | 4/2008 | Gabrys | |
| 7,728,446 B2 * | 6/2010 | Hofbauer et al. | 290/44 |
| 7,804,186 B2 * | 9/2010 | Freda | 290/55 |
| 7,854,594 B2 | 12/2010 | Judge | |
| 7,914,259 B2 | 3/2011 | Godsk | |
| 8,674,538 B2 * | 3/2014 | Lugg | 290/55 |
| 8,736,098 B2 * | 5/2014 | Choi et al. | 290/55 |
| 2003/0137149 A1 * | 7/2003 | Northrup et al. | 290/44 |
| 2005/0218656 A1 | 10/2005 | Wobben | |
| 2006/0244264 A1 | 11/2006 | Anderson et al. | |
| 2007/0110585 A1 | 5/2007 | Bonnet | |
| 2007/0222225 A1 | 9/2007 | Mahoney | |
| 2008/0095621 A1 | 4/2008 | Chi | |
| 2008/0170941 A1 | 7/2008 | Ghosh et al. | |
| 2008/0206062 A1 | 8/2008 | Sanz Pascual et al. | |
| 2008/0219850 A1 | 9/2008 | O'Connor et al. | |
| 2008/0231132 A1 * | 9/2008 | Minowa et al. | 290/55 |
| 2008/0272604 A1 | 11/2008 | Versteegh | |

(Continued)

*Primary Examiner* — Tho D Ta
(74) *Attorney, Agent, or Firm* — Stephen H. Hall; David E. Mixon; Bradley Arant Boult Cummings LLP

(57) ABSTRACT

A modular wind turbine has been developed that includes a turbine housing that contains a circular stabilization ring. The turbine also includes a central hub with multiple airfoil blades that are attached to the interior of the circular stabilization ring. A drive shaft extends from the central hub that turns an electric generator with multiple magnets and coils that generate electricity upon rotation of the of the drive shaft.

12 Claims, 21 Drawing Sheets

(56) References Cited

U.S. PATENT DOCUMENTS

| | | |
|---|---|---|
| 2008/0293260 A1* | 11/2008 | Christoffersen ............... 290/55 |
| 2009/0097981 A1 | 4/2009 | Gabrys |
| 2009/0102194 A1* | 4/2009 | M' Ariza Garcia San Miguel et al. ............... 290/44 |
| 2009/0246033 A1 | 10/2009 | Rudling |
| 2009/0295164 A1 | 12/2009 | Grabau et al. |
| 2009/0309369 A1 | 12/2009 | Gonzalez |
| 2009/0311099 A1 | 12/2009 | Richards |
| 2010/0001533 A1* | 1/2010 | Jefferson ............... 290/55 |
| 2010/0026010 A1 | 2/2010 | Pabst |
| 2010/0032954 A1 | 2/2010 | Law |
| 2010/0126086 A1 | 5/2010 | Paggi |
| 2010/0140951 A1* | 6/2010 | Pitre ............... 290/55 |
| 2010/0183443 A1 | 7/2010 | Thorne |
| 2010/0264663 A1 | 10/2010 | Barber |
| 2010/0266382 A1 | 10/2010 | Campe et al. |
| 2010/0266412 A1 | 10/2010 | Barber |
| 2010/0270799 A1 | 10/2010 | Schmidt |
| 2010/0283245 A1 | 11/2010 | Gjerlov et al. |
| 2011/0049902 A1* | 3/2011 | Miekka et al. ............... 290/55 |
| 2011/0109100 A1 | 5/2011 | Versteegh |
| 2011/0116927 A1 | 5/2011 | Hancock et al. |
| 2011/0120108 A1 | 5/2011 | Garmong |
| 2011/0233938 A1* | 9/2011 | Stiesdal ............... 290/55 |
| 2011/0254279 A1 | 10/2011 | Ventzke |
| 2012/0112461 A1* | 5/2012 | Saluccio ............... 290/50 |

* cited by examiner

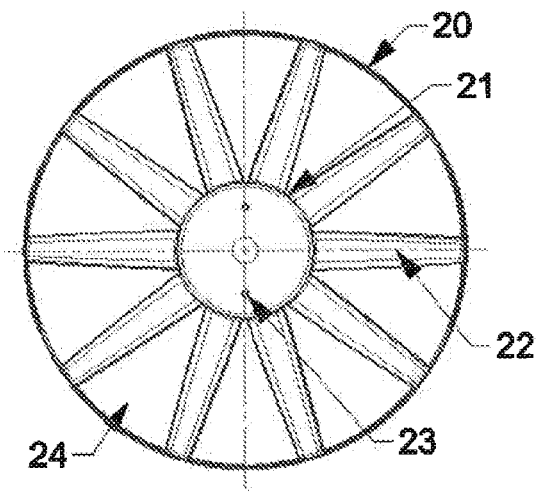
FIGURE 5
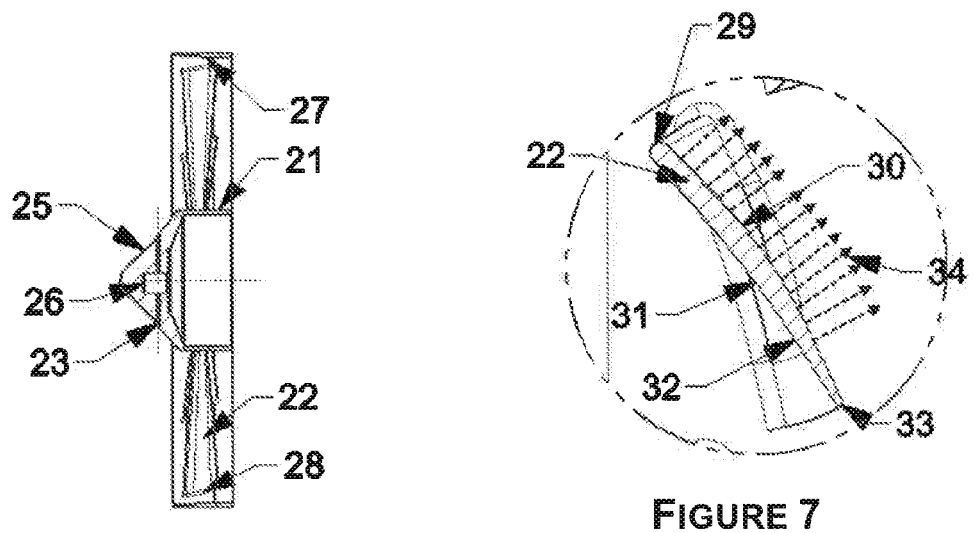
FIGURE 6
FIGURE 7

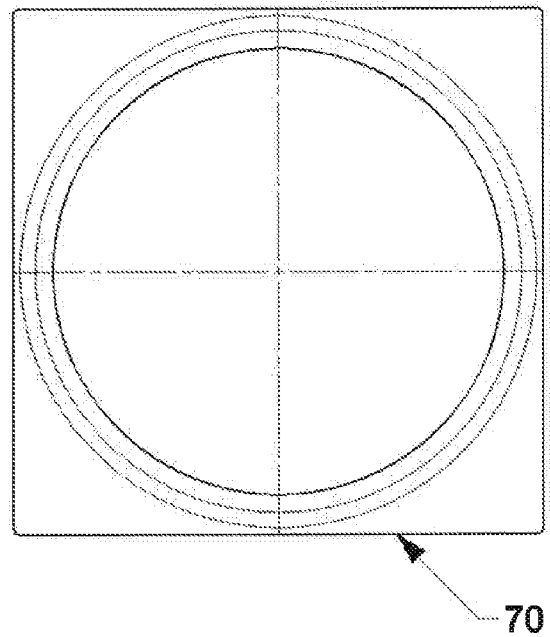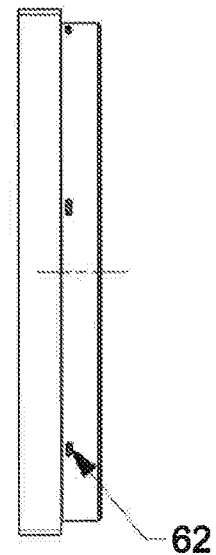
FIGURE 32  FIGURE 33
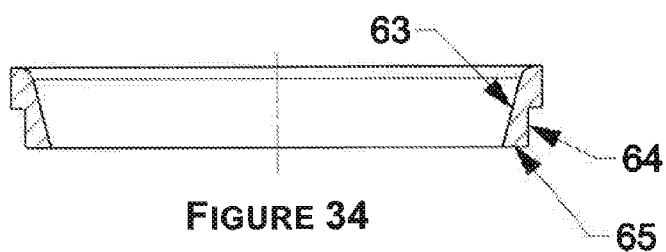
FIGURE 34

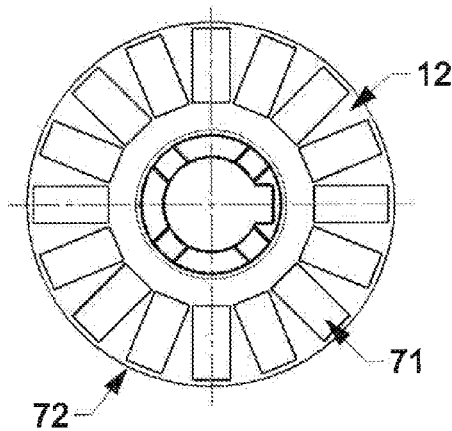
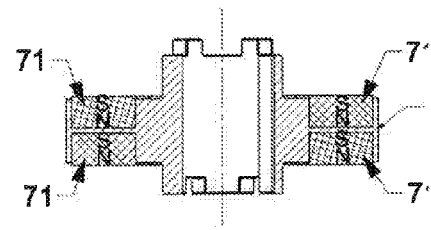
FIGURE 35
FIGURE 36
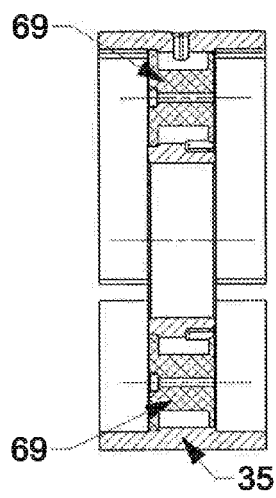
FIGURE 37
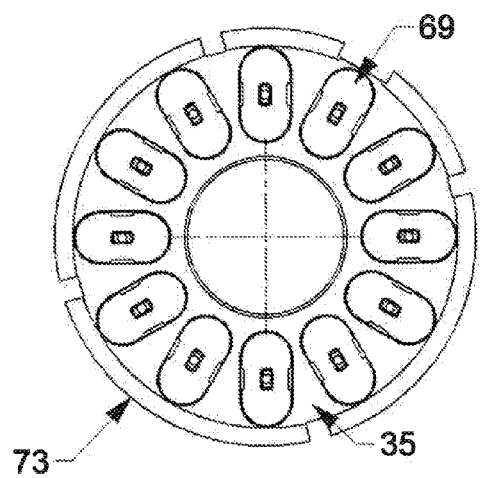
FIGURE 38

MODULAR MICRO WIND TURBINE

FIELD OF THE INVENTION

The present invention relates generally to a modular micro wind turbine for generating electricity. More specifically, the present invention relates to a ducted micro wind turbine containing more than two power generating units.

BACKGROUND ART

Centralized power distribution can have major impact to communities when the distribution system is taken down either from natural or man-made disasters. Solar panel production can provide some amount of power if the distribution system goes down. However, clouds frequently block the collection of energy to allow solar panel energy production. Solar panels also stop power generation during the night time hours.

One potential solution is large commercial grade wind turbines that generate significant amounts of power. However, these large commercial grade generators must be located away from the consumers. Distribution and transmission systems are required to move the power from the large commercial generation facility to the consumers. Large commercial grade wind turbines cannot operate in high wind conditions due to the inertia generated by the large turbine blades. Consequently, a need exists for smaller micro wind turbines that can provide a localized, efficient source of electrical energy.

SUMMARY OF THE INVENTION

In some aspects, the invention relates to a modular wind turbine, comprising: a turbine housing that contains a circular stabilization ring; multiple airfoil blades with an external end of each blade attached to the interior of the circular stabilization ring; a central hub connected to the interior end of each blade, where the airfoil blades rotate around the central hub; a drive shaft that extends from the central hub such that it rotates as the central hub turns; an electric generator that is powered by the drive shaft, comprising multiple magnets circularly attached around drive shaft, and multiple magnetic coils arranged within the housing in close proximity to the magnets so that electricity is generated upon rotation of the magnets.

In other aspects, the invention relates to a bank of modular wind turbines, comprising: multiple squared shaped turbine housings that each contain a circular stabilization ring, where the turbine housings a connected together to form a bank of housings; multiple airfoil blades with an external end of each blade attached to the interior of the circular stabilization rings; a central hub connected to the interior end of each blade, where the airfoil blades rotate around the central hub; a drive shaft that extends from the central hub such that it rotates as the central hub turns; and an electric generator that is powered by the drive shaft, comprising multiple magnets circularly attached around drive shaft, and multiple magnetic coils arranged within the housing in close proximity to the magnets so that electricity is generated upon rotation of the magnets.

In other aspects, the invention relates to a bank of modular wind turbines, comprising: multiple hexagonally shaped turbine housings that each contain a circular stabilization ring, where the turbine housings a connected together to form a bank of housings; multiple airfoil blades with an external end of each blade attached to the interior of the circular stabilization rings; a central hub connected to the interior end of each blade, where the airfoil blades rotate around the central hub; a drive shaft that extends from the central hub such that it rotates as the central hub turns; and an electric generator that is powered by the drive shaft, comprising multiple magnets circularly attached around drive shaft, and multiple magnetic coils arranged within the housing in close proximity to the magnets so that electricity is generated upon rotation of the magnets.

Other aspects and advantages of the invention will be apparent from the following description and the appended claims.

BRIEF DESCRIPTION OF DRAWINGS

It should be noted that identical features in different drawings are shown with the same reference numeral.

FIG. 5 is a view of a multi blade wind turbine fan that drives the direct displacement generator in accordance with one embodiment of the present invention.

FIG. 6 is a cross-sectional view of FIG. 5.

FIG. 7 is a cross-sectional view of a single wind turbine blade airfoil design in FIG. 5 in accordance with one embodiment of the present invention.

FIG. 32 is a square end cap holding the Fan Turbine Case into the modular square housing in accordance with one embodiment of the present invention.

FIG. 33 is a side view of FIG. 32.

FIG. 34 is a cross-sectional view of FIG. 32 showing the inlet design.

FIG. 35 is a main rotor with the rare earth magnets assembled in accordance with one embodiment of the present invention.

FIG. 36 is a cross-sectional view of the main rotor in accordance with one embodiment of the present invention.

FIG. 37 is an end view of the stator assembly with the magnetic wire spools mounted in accordance with one embodiment of the present invention.

FIG. 38 is a cross-sectional view of FIG. 37.

DETAILED DESCRIPTION

Figure 1:
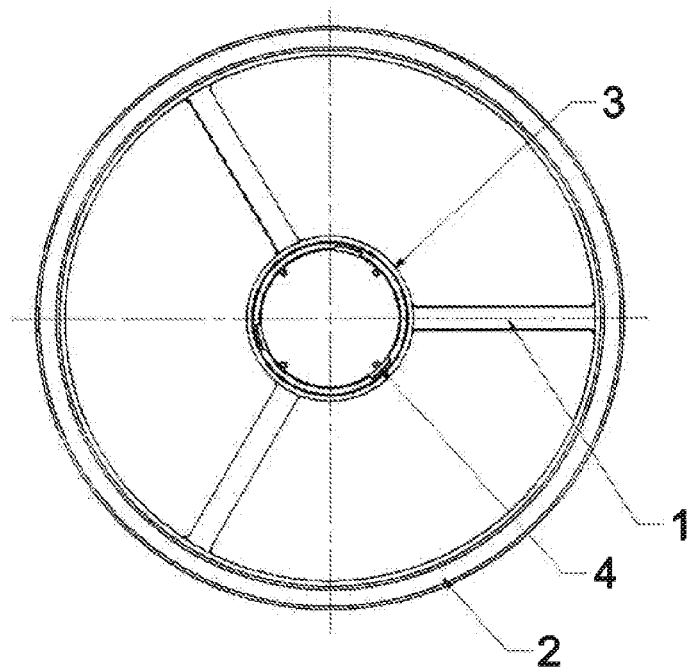
FIG. 1 is an end view of the modular wind turbine generator and fan case in accordance with one embodiment of the present invention.

The present invention provides a modular small low cost wind turbine generator that affords substantially increased energy production with the ability to integrate into existing structures in the rural, suburban, urban and highly dense cities. The micro wind turbines can be easily connected to other micro wind turbines to form a larger generation panel similar to solar panels. These panels of wind turbines can be located at the edge of any building structure such as walls, fences, decks, rooftops, roof peaks or in a standalone system.

The ability to connect multiple modular wind turbines improves the overall capture of wind currents. Less wind current escapes the micro wind turbine design as compared to small to larger designs and improves the overall effectiveness of each adjacent micro wind turbine. An example is holding a hand into the wind has relative little resistance, however, holding a plywood panel against the same wind current will generally knock down the individual holding the panel in the wind. Multiple micro wind turbines enhance the power generation performance significantly.

The micro wind turbine fan is constructed to be sustainable in high wind currents due to the design of the wind turbine blades and housing. The blades attach to the outer housing eliminating the bending and fracture effects of individual blades during high wind currents. The blade design also works in low wind currents in the range of 2-4 mph due to the rotational twist and concave nature of the airfoil design. The housing surrounding the fan blades also increases the performance of the airfoils by not allowing wind current to escape off the tips of the turbine blades. The wind turbine blade airfoil is designed with a low pressure side which improves the performance of the turbine blades causing the blades to spin faster in the rotational axis overcoming the power generation system and the friction produced by the bearings.

The inlet housings for the micro wind turbine compacts the air increasing the velocity of the air and density of the air flowing through the micro wind turbine fan blades. This compression increases the overall performance of each micro wind turbine generator.

The modular design of the micro wind turbine allows multiple wind turbines to be connected either in a large grid pattern or in a chain of micro wind turbines behind one another or in combination with both grid pattern and a chain configuration. This design allows the micro wind turbines to be placed in and around any structure near the power consumption needs.

The micro wind turbine has multiple (more than two) power generators in some embodiments. Each power generator can produce substantial energy. Due to the design of the power generators and the permanent magnets, the design adds efficiencies in the power output. Maintaining close proximity of adjacent magnets adds to the power generated within each magnetic wire coil set increasing individual power generating unit output to increase the total power output. The micro wind turbine generating units may be installed in a sealed housing allowing for implementation in high humidity and severe weather conditions.

Figure 2:
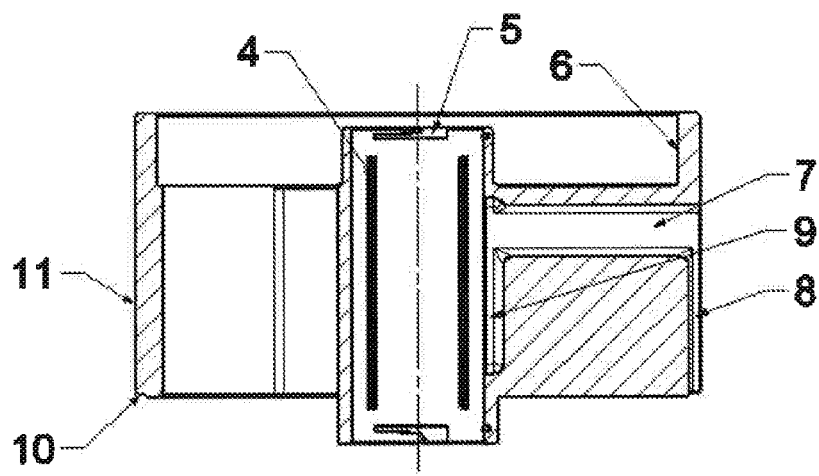
FIG. 2 is a cross-sectional view of FIG. 1.
Figure 42:
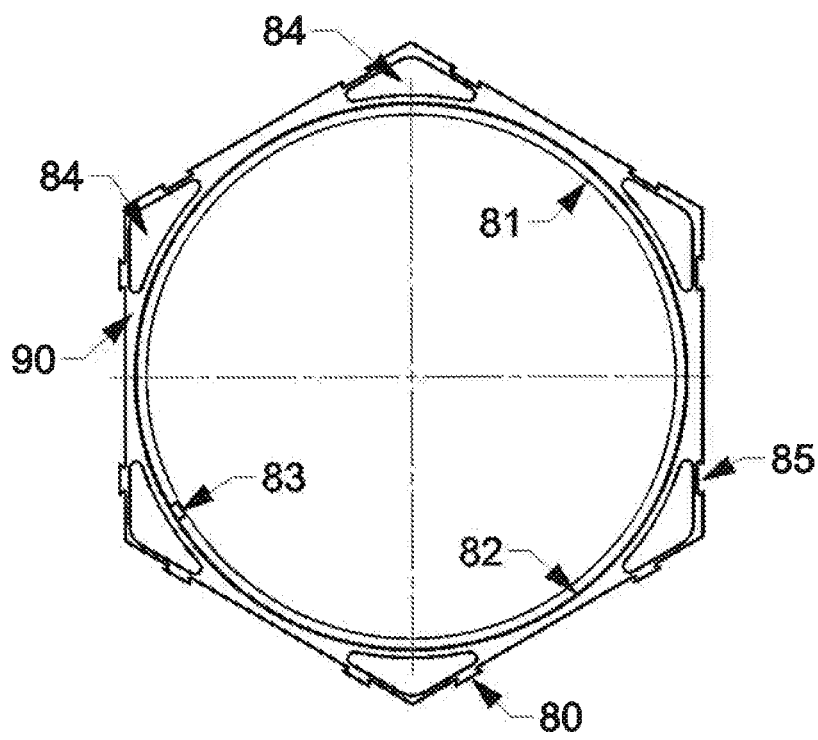
FIG. 42 is a view of a hexagonal modular case in accordance with one embodiment of the present invention.
Figure 43:
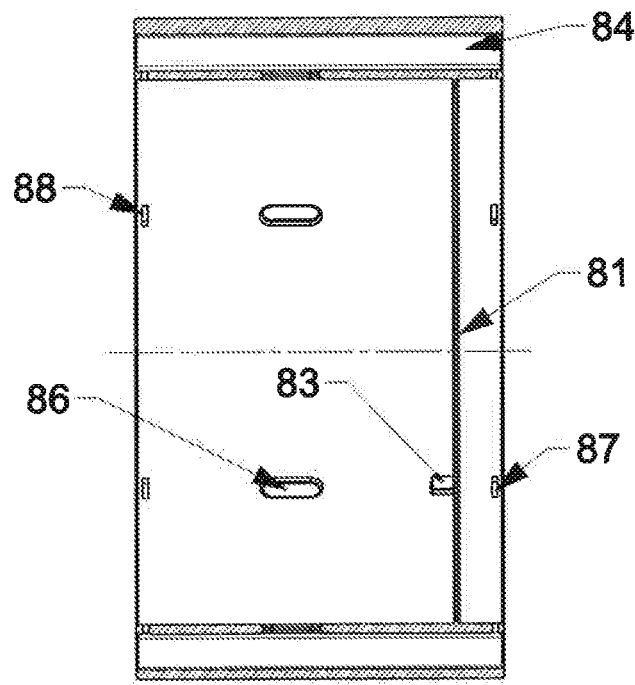
FIG. 43 is a cross-sectional view of FIG. 42.
Figure 44:
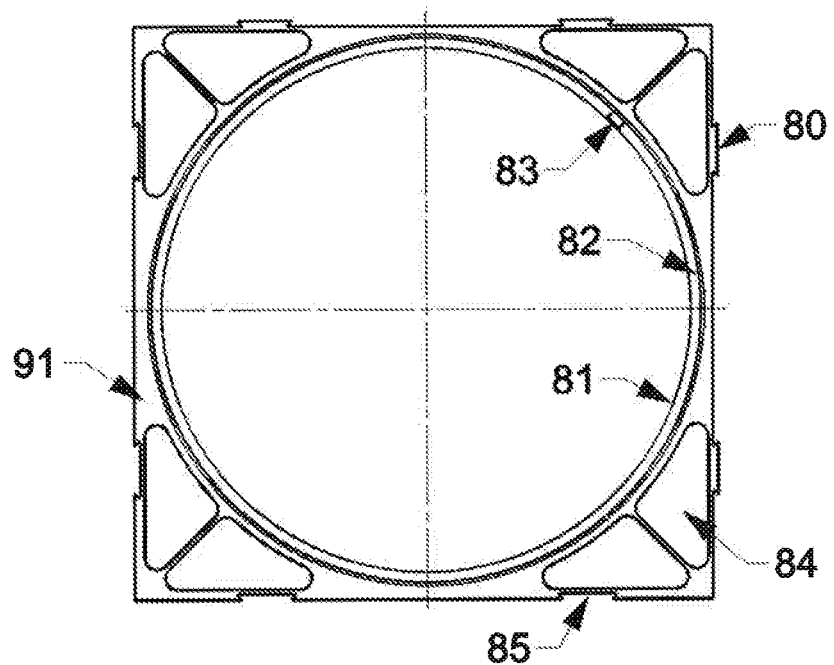
FIG. 44 is a view of a square modular case in accordance with one embodiment of the present invention.
Figure 45:
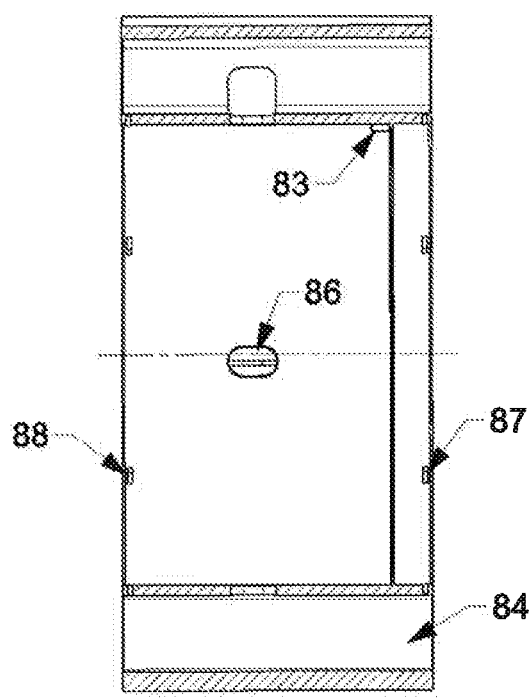
FIG. 45 is a cross-sectional view of FIG. 44.
Figure 50:
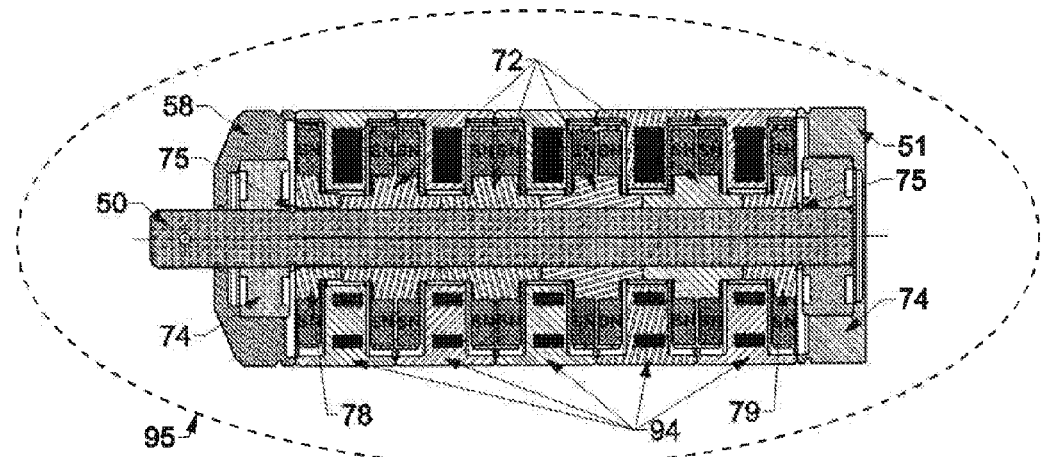
FIG. 50 is a cross-sectional view of the assembly of the generator with integrated coils in accordance with one embodiment of the present invention.
Figure 51:
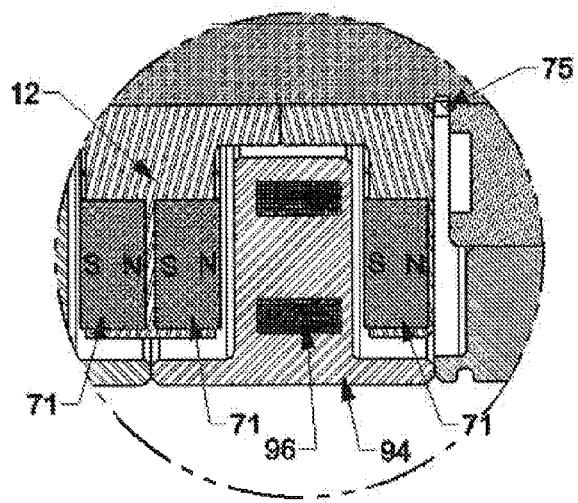
FIG. 51 is an exploded view of FIG. 50.
Figure 52:
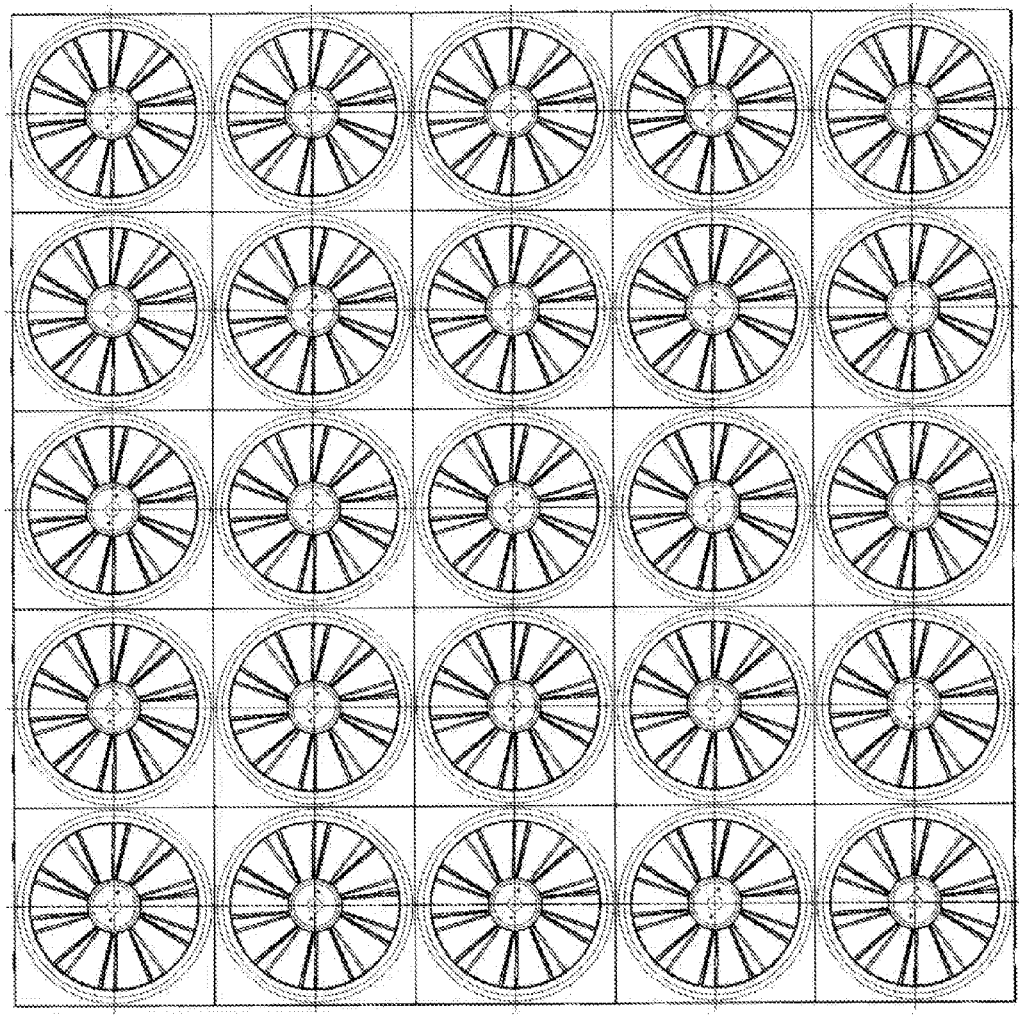
FIG. 52 is a view of a square modular micro wind turbine arrangement in accordance with one embodiment of the present invention.
Figure 53:
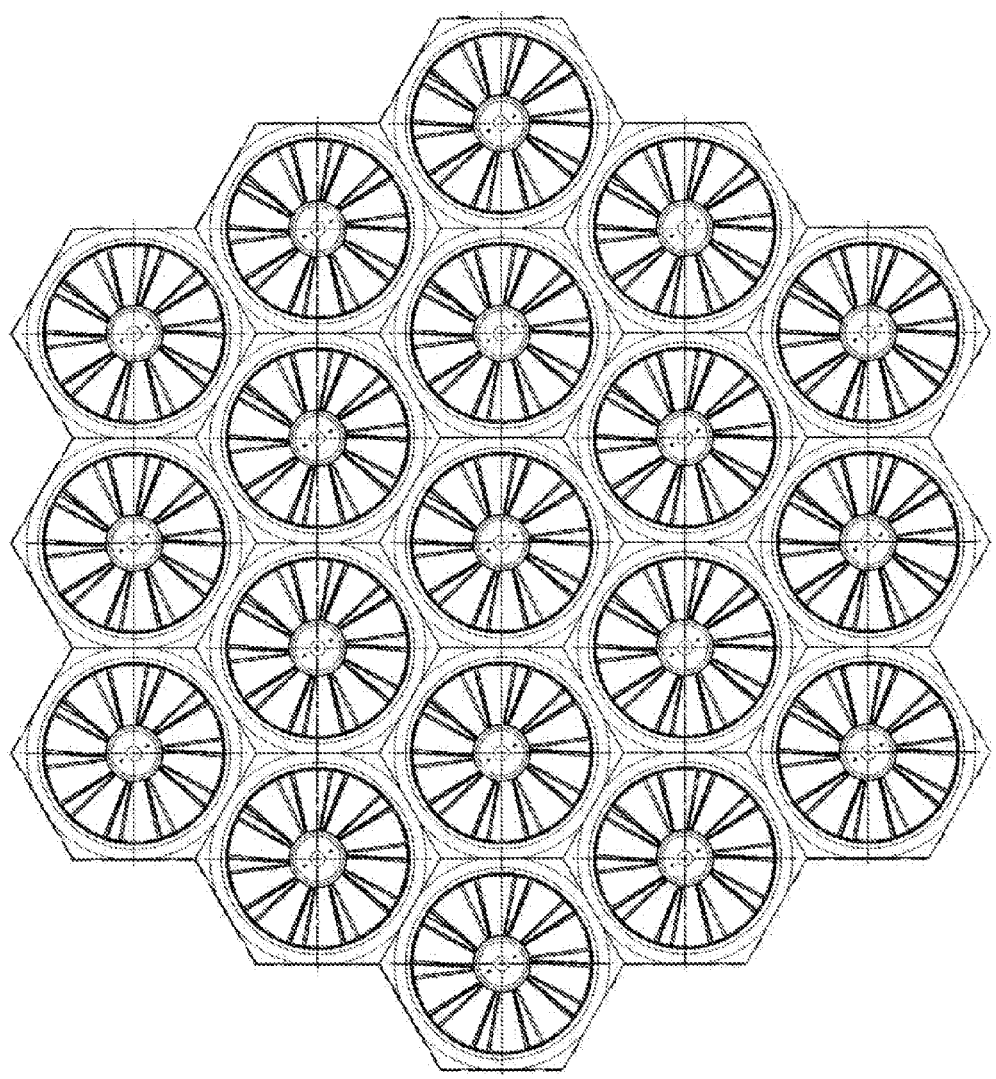
FIG. 53 is a view of a hexagon modular micro wind turbine arrangement in accordance with one embodiment of the present invention.

One embodiment of the generator core 77 (FIG. 39) or 95 (FIG. 50) is mounted in the generator case 3 (FIG. 1). The turbine case housing 11 (FIG. 2) is optionally mounted in a modular assembly case consisting of hexagonal modular case 90 (FIG. 42) or square modular case 91 (FIG. 44). The turbine case housing 11 (FIG. 2) can be directly integrated into another shape case or structure.

One embodiment of the hexagonal modular case 90 (FIG. 42) or the square modular case 91 (FIG. 44) can be connected together using the dovetail 80 (FIGS. 42 & 44) mating with attached cases via the dovetail slot 85 (FIGS. 42 & 44) in order to form a larger array structure of micro wind turbines.

Figure 46:
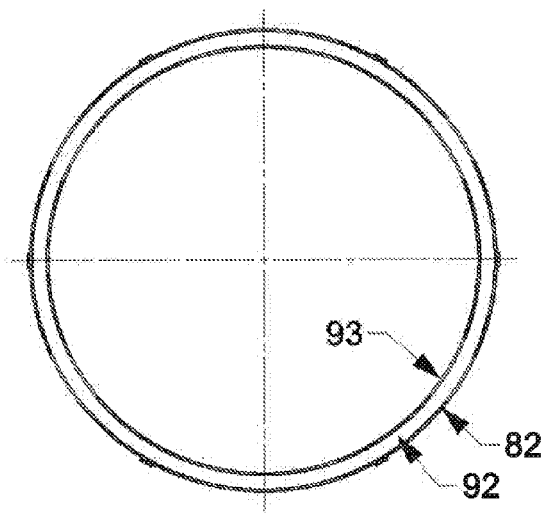
FIG. 46 is a view of a modular linear case connector in accordance with one embodiment of the present invention.
Figure 47:
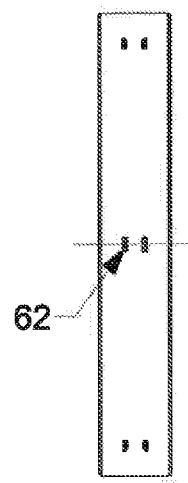
FIG. 47 is a side view of FIG. 46.

One embodiment of the hexagonal modular case 90 (FIG. 42) or the square modular case 91 (FIG. 44) can be connected in a linear chain using the modular linear case connector 92 (FIG. 46) by attaching the modular cases using the modular case attachment tab 62 (FIGS. 42, 44 and 46) in order to form a structure to collect more power from stronger wind current conditions.

One embodiment of the generator core 95 (FIG. 50) is an assembly of main draft shaft 50, end cap with shaft seal 58, two ABEC bearings 74, two snap rings 75, rotor end assembly with drive slots 78, one or more stator with integrated coils 94, one or more main rotor assembly 72, rotor end assembly with drive slots 79, drive key 50 (FIG. 39), and an end bearing cap with seal 51.

One embodiment of the generator core 77 (FIG. 39) is an assembly of main draft shaft 50, end cap with shaft seal 58, two ABEC bearings 74, two snap rings 75, rotor end assembly with drive slots 78, one or more stator assemblies 73, one or more main rotor assembly 72, rotor end assembly with drive slots 79, drive key 50, and an end bearing cap with seal 51.

Figure 48:
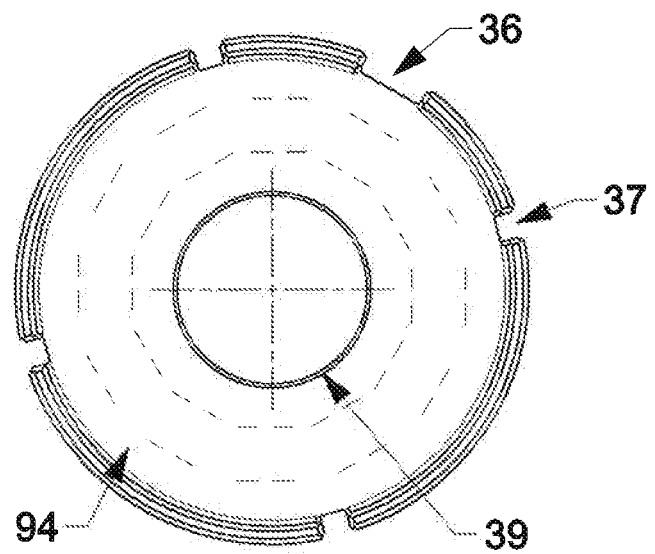
FIG. 48 is a view of a stator with integral coils in accordance with one embodiment of the present invention.
Figure 49:
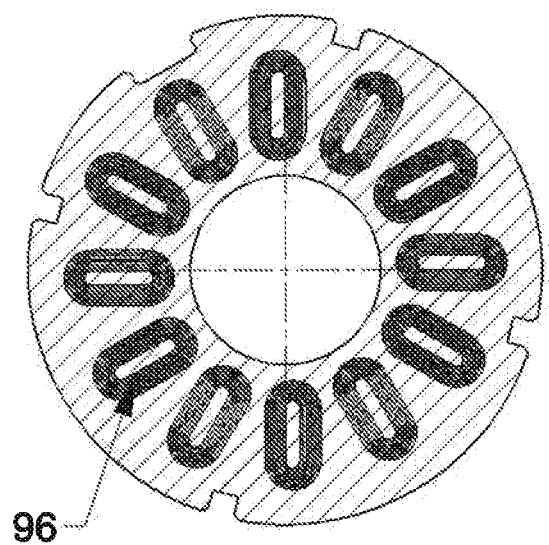
FIG. 49 is a cross-sectional view of FIG. 48.

One embodiment of the stator with integrated coils 94 (FIG. 48) is the stator alignment slots 37, the wiring slot 36, and the magnetic wire coiled 96 integrated internally to the stator material. The number of magnetic wire coils 96 contained within stator follows the ratio of magnets to coils shown in the chart below for a three phase design:

| Coils | Magnets | Coils/Phase |
|---|---|---|
| 3 | 4 | 1 |
| 6 | 8 | 2 |
| 9 | 12 | 3 |
| 12 | 16 | 4 |
| 15 | 20 | 5 |

One embodiment of the stator assembly 73 (FIG. 37) is the stator 35 and the magnetic wire winding spool 69 and the magnetic wire. The ratio of magnetic wire winding spools to the number of magnets is shown in the above chart for a three phase design. One embodiment of the main rotor assembly 72 (FIG. 35) is the main rotor 12 and the permanent magnets. The ratio of magnetic wire spools to the number of magnets is shown in the above chart for a three phase design.

One embodiment of the modular square end cap 70 (FIG. 32) is the four sided shape of the design, modular case attachment tabs 62, the modular hub 64, the wind turbine case face 65 and the air compression bore 63. The air compression bore 63 increases the velocity of the air flowing into the micro wind turbine which increases the forces needed to turn the wind turbine fan and blades 24 (FIG. 5).

Figure 30:
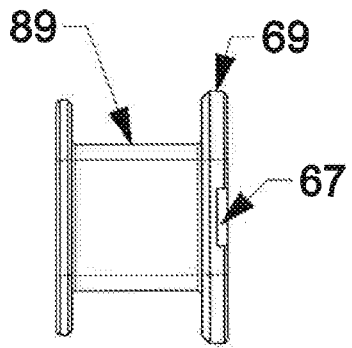
FIG. 30 is a side view of FIG. 29.
Figure 31:
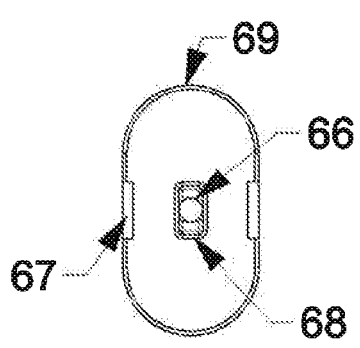
FIG. 31 is a back end view of FIG. 29.

One embodiment of the magnetic wire winding spool 69 (FIG. 30) is the spool winding bore 69, the spool winding tray 89, the spool locking surface 67 and the spool winding orientation notch 68. Magnetic wire is wound around the magnetic wire winding spool 69 and then inserted into the stator assembly 73 (FIG. 37). The number if magnetic wires wound around the spool identify the amount of voltage derived from each of the spools.

Figure 26:
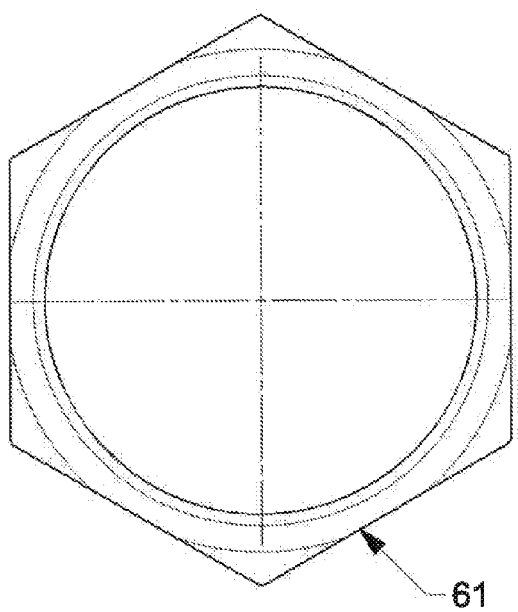
FIG. 26 is a view of a hexagonal end cap holding the Fan Turbine Case into the modular hexagonal housing in accordance with one embodiment of the present invention.
Figure 27:
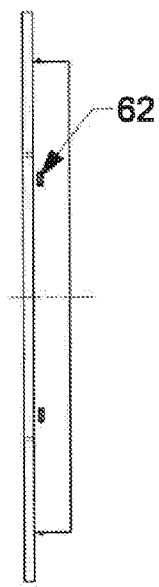
FIG. 27 is a side view of FIG. 26.
Figure 28:
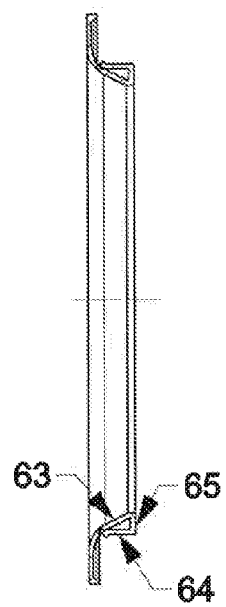
FIG. 28 is a cross-sectional view of FIG. 26 showing the inlet design.
Figure 29:
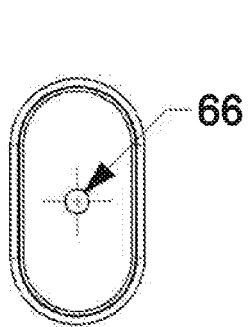
FIG. 29 is an end view of the spool which holds the magnetic accordance with one embodiment of the present invention.

One embodiment of the modular hexagon end cap 61 (FIG. 26) is the six sided shape of the design, modular case attachment tabs 62, the modular hub 64, the wind turbine case face 65 and the air compression bore 63. The air compression bore 63 increases the velocity of the air flowing into the micro wind turbine which increases the forces needed to turn the wind turbine fan and blades 24 (FIG. 5).

Figure 24:
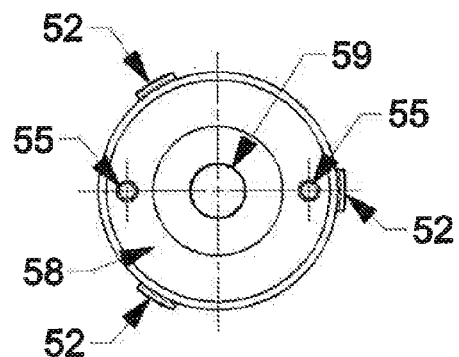
FIG. 24 is a back view of FIG. 22 showing the spanner wrench holes.
Figure 25:
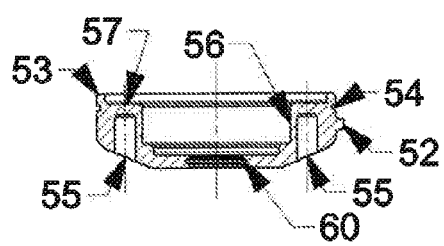
FIG. 25 is a cross-sectional view of FIG. 22.

One embodiment of the end cap with shaft seal 58 (FIG. 24) is the main drive shaft bore 59, the spanner wrench holes 55, the locking attachment tab 52, the seal groove 54 (FIG. 25), the stator face 53, the rotor clearance 57, the ABEC bearing mount 56, and the main drive shaft seal 60. The end caps provide the necessary seals to allow the micro wind turbine to operate in humid/wet conditions.

Figure 18:
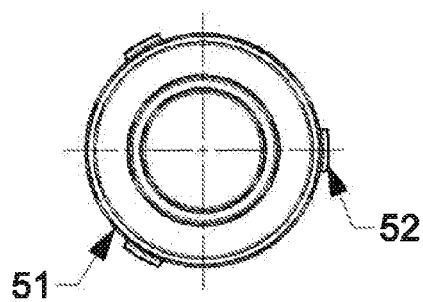
FIG. 18 is a non-fan end cap holding the bearing and seal in accordance with one embodiment of the present invention.
Figure 19:
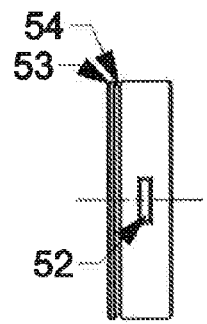
FIG. 19 is a side view of FIG. 18 showing the locking attachment and seal groove.
Figure 20:
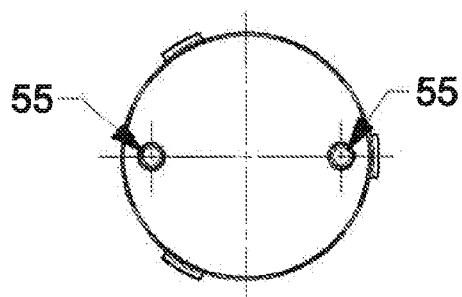
FIG. 20 is a back side view of FIG. 18 showing the spanner wrench holes.
Figure 21:
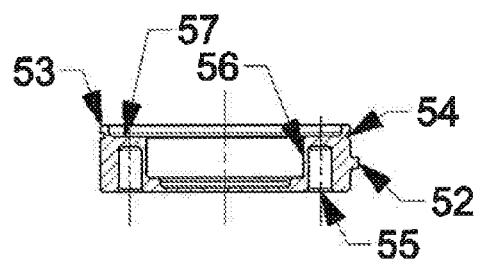
FIG. 21 is a cross-sectional view of FIG. 18 showing internal design.
Figure 22:
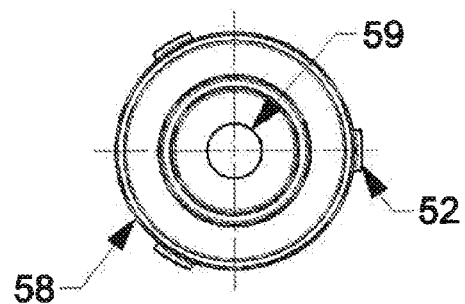
FIG. 22 is a fan end cap holding the bearings, seal and drive shaft in accordance with one embodiment of the present invention.
Figure 23:
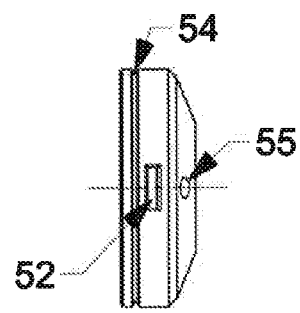
FIG. 23 is a side view of FIG. 22 showing the locking attachment tab and the seal groove.

One embodiment of the end bearing cap and seal 51 (FIG. 18) is the spanner wrench holes 55, the locking attachment tab 52, the seal groove 54 (FIG. 21), the stator face 53, rotor clearance 57 and the ABEC bearing mount 56. The end caps provide the necessary seals to allow the micro wind turbine to operate in humid/wet conditions.

Figures 15, 16, 17:
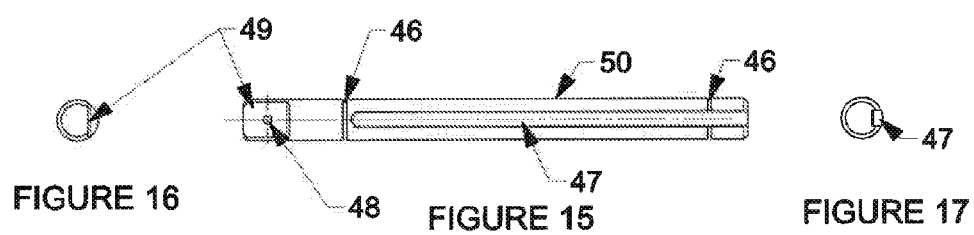
FIG. 15 is a view of a main drive shaft of the modular wind turbine fan and generator in accordance with one embodiment of the present invention.
FIG. 16 is an end view from the fan side of FIG. 15.
FIG. 17 is an end view from the non-fan side of FIG. 15.

One embodiment of the main drive shaft 50 (FIG. 15) is the snap ring grooves 46, the main drive keyway slot 47, main drive shaft turbine blade mount 49 and the drive pin for the turbine blade fan 48.

Figure 13:
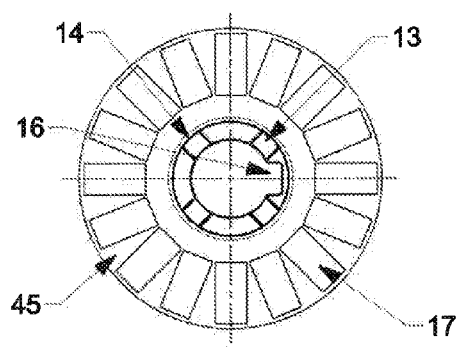
FIG. 13 is an end view of the last rotor without magnets for the generator in accordance with one embodiment of the present invention.
Figure 14:
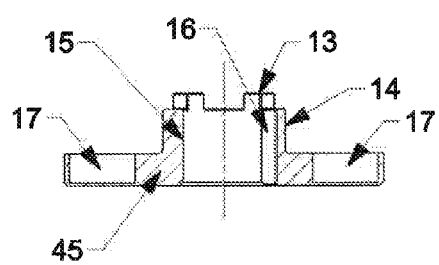
FIG. 14 is a cross-sectional view of FIG. 13.

One embodiment of the rotor end with keys 45 (FIG. 13) is the rotor drive key 13, the rotor hub 14, rotor bore 15, master drive key slot 16 and the magnet pockets 17. The ratio of magnetic wire winding spools to the number of magnets is shown in the chart above for a three phase design.

Figure 11:
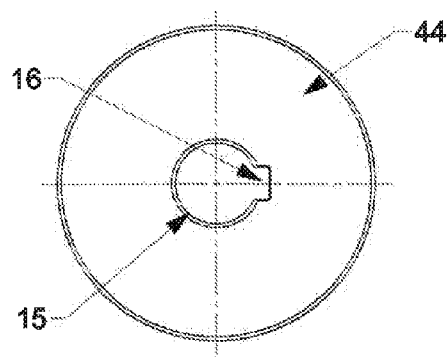
FIG. 11 is an end view of the initial rotor without magnets for the generator in accordance with one embodiment of the present invention.
Figure 12:
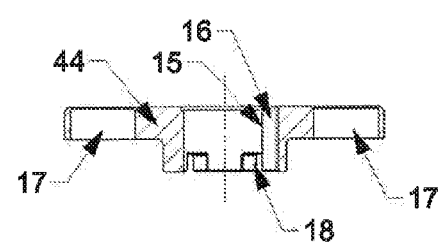
FIG. 12 is a cross-sectional view of FIG. 11.

One embodiment of the rotor end with slots 44 (FIG. 11) is the rotor bore 15, master drive key slot 16, magnet pockets 17 and the rotor drive slots. The ratio of magnetic wire winding spools to the number of magnets is shown in the chart above for a three phase design.

Figure 8:
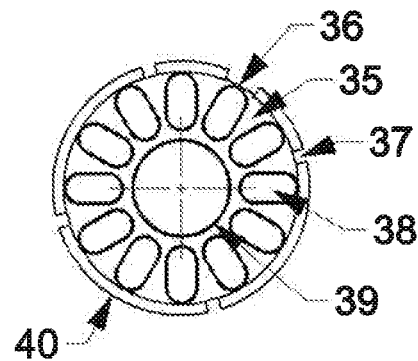
FIG. 8 is an end view of the stator used to hold the spools of magnetic wire in accordance with one embodiment of the present invention.
Figure 9:
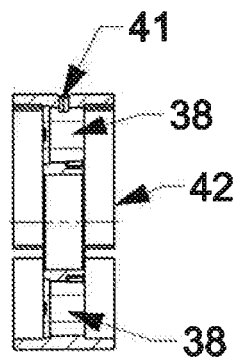
FIG. 9 is a cross-sectional view of FIG. 8.
Figure 10:
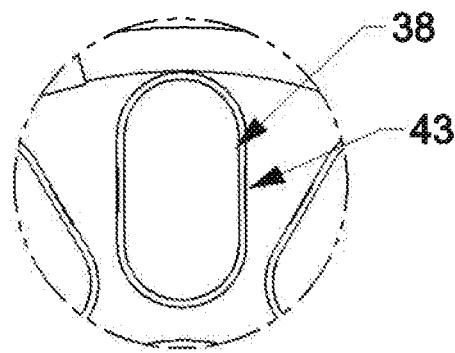
FIG. 10 is an exploded view of the locking mechanism holding the spools into the stator in accordance with one embodiment of the present invention.

One embodiment of the stator 35 (FIG. 8) is the wiring slot 36, the stator alignment slot 37, coil pocket 38, stator bore 39 and the stator hub 40. The ratio of coil pockets to the number of magnets is shown in the chart above for a three phase design.

Figure 39:
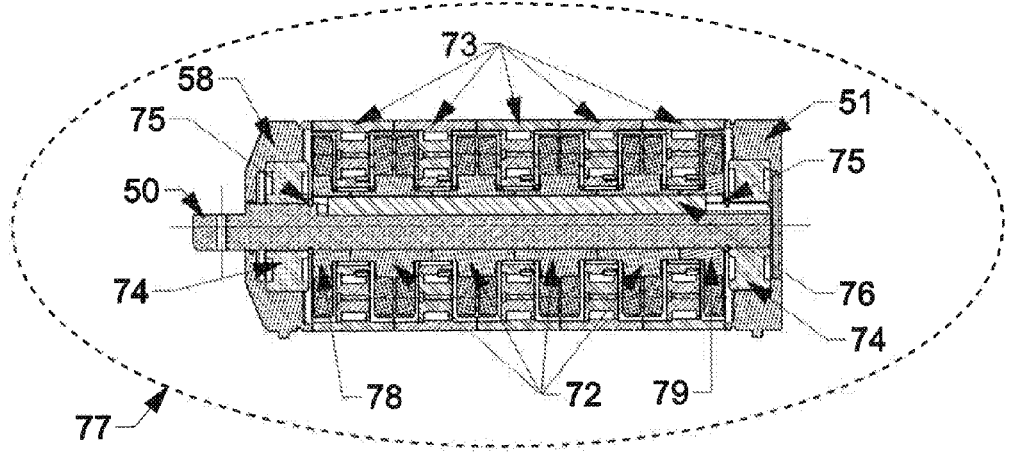
FIG. 39 is a cross-sectional view of the assembly of the generator.
Figure 40:
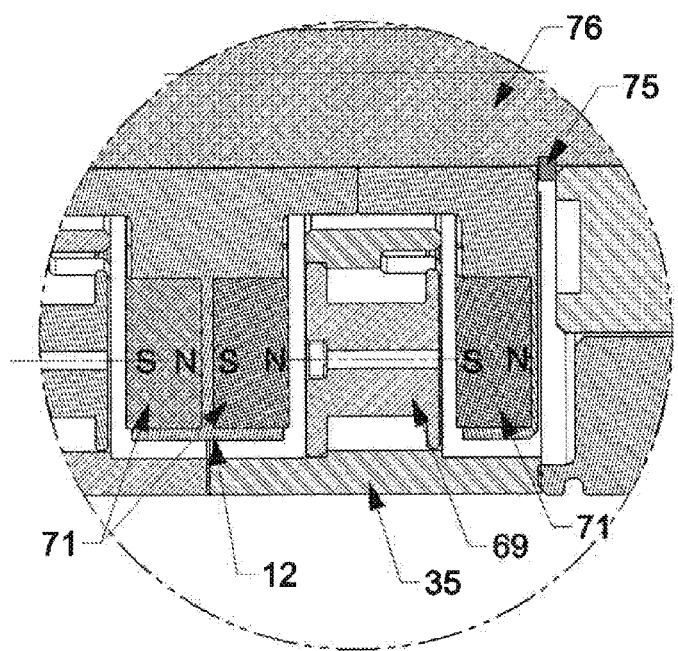
FIG. 40 is an exploded view of FIG. 39 detailing the wire spools, rotors, stator and magnets.
Figure 41:
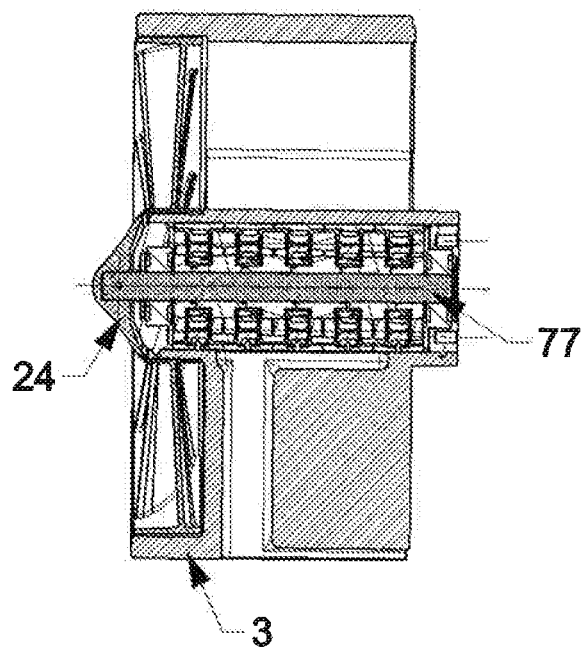
FIG. 41 is a cross-section of the Micro Wind Turbine fan and generator assembly in accordance with one embodiment of the present invention.

One embodiment of the wind turbine fan with airfoil blades 24 (FIG. 5) is the turbine blade hub 21, turbine airfoil blades with rotational twist 22, attachment pin 23, nose cone 25, main drive shaft hub 26 and the turbine blade stabilizer ring 20. The turbine blade stabilizer ring 20 has several effects on the wind turbine fan: 1) during high wind current conditions the ends of the fan blades would normally deflect for which the stabilizer ring reduces the deflection and allows the wind turbine to operate in the higher wind conditions; 2) the stabilizer ring compresses the wind current through the wind turbine increasing the wind force applied to the turbine airfoil blades; 3) wind current normally leaving the ends of airfoils creates turbulence for which stabilizer ring eliminates and increases the performance of the airfoils. The nose cone 25 directs wind current around the turbine blade hub 21 and the generator core with power generators 77 (FIG. 39). The turbine blade hub 21 covers the generator core 77 increasing the protection of the generator core 77 from the elements.

One embodiment of the turbine airfoil blades with rotational twist 22 (FIG. 7) is the low pressure side of airfoil 30 which has the shape of the upper side of a wing and a high pressure side of airfoil 32 and the concave airfoil surface 31 collects the wind current to enable the rotation of the fan blades. As the turbine fan increases the rotational speed, the low pressure side of the airfoil 32 reduces the pressure allowing the turbine blades to rotate with increased velocity. The rotational twist enables the lower speed of the wind current at the turbine hub 21 with the higher speed of the wind at the turbine blade stabilizer ring 20.

Figure 3:
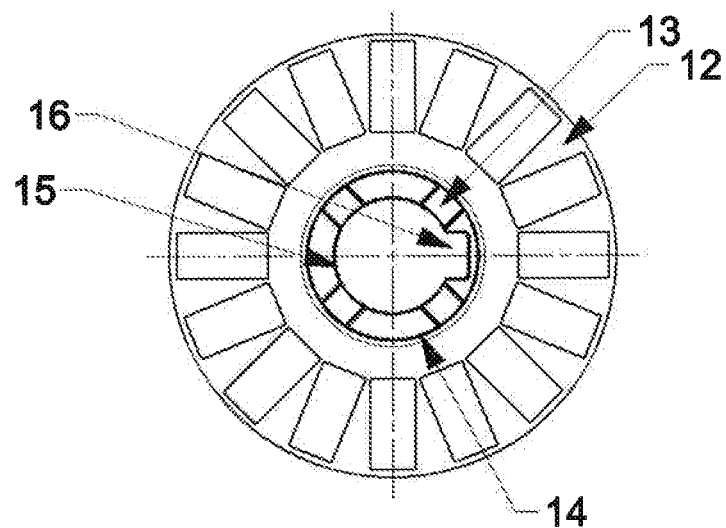
FIG. 3 is a view of a main rotor used in the generator section without the magnets in accordance with one embodiment of the present invention.
Figure 4:
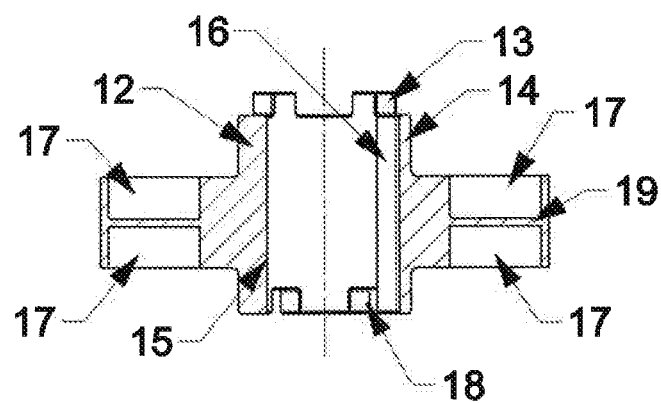
FIG. 4 is a cross-sectional view of FIG. 3.

One embodiment of the main rotor 12 (FIG. 3) is the rotor drive key 13, the rotor hub 14, rotor bore 15, master drive key slot 16, magnet pocket 17, rotor drive slot 18 and the rotor magnet gap 19. Combining magnets on both sides of the rotor reduces the functional space within the generator providing for more power generating units. The rotor magnet gap if reduced increases the overall efficiencies of the generating core by allowing adjacent magnets to increase the power to adjacent stator units. Increasing the gap reduces the effect of adjacent magnets to adjacent stator units. The rotor drive keys 13 drives adjacent rotors by inserting the key into the rotor drive slot 18 which relieves the stress on the single drive key 76.

One embodiment of the turbine case housing 11 (FIG. 2) is the generator case support 1, the cowling 2, generator case 3, stator alignment key 4, locking attachment key 5, turbine blade shroud 6, turbine case wire routing channel 7, external wire routing channel 8, internal write routing channel 9, turbine case stop 10 and turbine case housing 11.

An exemplary embodiment of the invention captures the energy of wind currents by utilizing multiple air foil blades in modular micro wind driven turbine that produces less than 1 kW of peak electrical power utilizing a series of permanent magnet direct drive generators that produces power that varies with wind speed. One embodiment of the modular micro wind turbines can be located adjacent to sides of buildings, building roofs, other vertical structures (fences), in line with wind generating currents or in a variable direction standalone structure. In one embodiment modular micro wind turbines are placed at a side of a building. En another embodiment modular micro wind turbines are placed along the top of a fence. In another embodiment modular micro wind turbines are placed at the edge or peak of a roof. One embodiment of the modular micro wind turbines can be integrated within a building structure to obscure viewing of the micro turbine. A modular micro wind turbine drives a series (three or more) of internal permanent magnet direct drive generators. The axis of rotation is horizontal to the wind current. The micro wind turbines can be installed in multiple directions to accept varying wind currents as changes in wind currents change over seasons and with weather conditions. The modular micro wind turbine operates within a range of low wind currents (2-4 mph) to extremely high wind currents (60+ mph).

Still other embodiments of the invention could be mounted on an aircraft or an automobile in order to provide localized power generation to onboard devices, etc. It is important to realize that other embodiments of the invention could be used as water driven turbines instead of wind. Such examples could be mounted on boats or similar structures where the turbines are exposed to fluid flow.

A micro wind turbine generator may be located in an urban community, attached to nearby structures such as a house, a deck, a fence, near the roof top or at the roof line to capture wind currents that are generated around and over normal urban structures. Micro wind turbines may be capable of being attached to other micro wind turbines similar to solar cells are attached to one another to create a solar panel. The micro wind turbine needed to be made modularized to be arranged in a pattern that would be acceptable in urban communities generally hidden from normal viewing. These micro wind turbines need to generate enough power to operate refrigerators, freezers, televisions, radios, provide backup power for home computers, charge cell phone batteries and operation of landline telephones. This type of system would not require commercial distribution and transmission lines but could be easily integrated within the consumer electrical systems. The micro wind turbines should be capable of operating in high and low wind conditions. The micro wind turbines should be easily maintained by the consumer and be inexpensive to install.

The micro wind turbine could be attached to commercial building structures to provide battery backup support systems for businesses, extending the life of their battery systems. In some cases the power could be extended for a duration that would allow the utility companies time to re-establish the distribution and transmission grid in the event of a power outage.

In other embodiments, a widely distributed power generation system could work in a fashion using the current distribution and transmission facilities in concert with micro wind turbines. Businesses and homes scattered throughout the country could be power generation units using the micro turbines. Each small power generation system would operate in a standalone environment and the excess power would be distributed to other consumers. If the individual power generation units did not supply enough energy then the system would consume power from the external power grid. This widely distributed system would be more secure than centralized power generation systems. When natural or man-made disasters occur, the widely distributed system allows the economy to continue to function normally.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A modular wind turbine, comprising:
    a turbine housing that contains a circular air compression bore with a decreasing circumference that increases the velocity of air flow by funneling the air flow through the bore;
    multiple airfoil blades with an external end of each blade attached to the interior of a circular stabilization ring that;
    a central hub connected to the interior end of each blade, where the airfoil blades rotate around the central hub;
    a drive shaft that extends from the central hub such that it rotates as the central hub turns;
    an electric generator that is powered by the drive shaft, comprising a series of alternating stators and rotors configured along said drive shaft, said series of rotors comprising an initial rotor, a first main rotor, and a second main rotor, and said series of stators comprising a first stator between said initial rotor and first main rotor, and a second stator between said first main rotor and second main rotor, and wherein said first and second main rotors comprise a plurality of axially aligned opposing, magnet pockets on each side of the first and second main rotors, each of the opposing magnet pockets containing an axially aligned magnet, and wherein the axially aligned magnets in the magnet pockets are oriented such that opposing magnetic poles face each other, wherein the two axially aligned magnets of the first main rotor and the two axially aligned magnets of the second main rotor create a magnetic flux in the second stator when rotated about the drive shaft.

2. The turbine of claim 1, further comprising a nose cone located on the central hub that directs airflow to the airfoil blades.

3. The turbine of claim 1, where the each airfoil blade is shaped with a rotational twist that is oriented downward away from the direction of the airflow along the rear edge of the airfoil blade so that the airfoil blade produces a high pressure surface facing the airflow and an opposing low pressure surface facing away from the airflow.

4. The turbine of claim 1, where the high pressure surface comprises a concave curve.

5. The turbine of claim 1, where the low pressure surface comprises a convex curve.

6. The turbine of claim 1, where the external blade rotational diameter is approximately 25 mm.

7. The turbine of claim 1, where the external blade rotational diameter is approximately 610 mm.

8. The turbine of claim 1, where the external blade rotational diameter is within the range of between 25 mm and 610 mm.

9. The turbine of claim 1, where the turbine housing is squared shaped.

10. The turbine of claim 1, where the turbine housing is hexagonally shaped.

11. A bank of modular wind turbines, comprising:

multiple squared shaped turbine housings that each contain a circular air compression bore with a decreasing circumference that increases the velocity of air flow by funneling the air flow through the bore, where the turbine housings a connected together to form a bank of housings;

multiple airfoil blades with an external end of each blade attached to the interior of the circular air compression bores;

a central hub connected to the interior end of each blade, where the airfoil blades rotate around the central hub;

a drive shaft that extends from the central huh such that it rotates as the central hub turns; and an electric generator that is powered by the drive shaft, comprising a series of alternating stators and rotors configured along said drive shaft, said series of rotors comprising an initial rotor, a first main rotor, and a second main rotor, said series of stators comprising a first stator between said initial rotor and first main rotor, and a second stator between said first main rotor and second main rotor, and wherein said first and second main rotors comprise a plurality of axially aligned opposing magnet pockets on each side of the first and second main rotors, each of the opposing magnet pockets containing an axially aligned magnet, and wherein the axially aligned magnets in the magnet pockets are oriented such that opposing magnetic poles face each other, wherein the two axially aligned magnets of the first main rotor and the two axially aligned magnets of the second main rotor create a magnetic flux in the second stator when rotated about the drive shaft.

12. A bank of modular wind turbines, comprising:

multiple hexagonally shaped turbine housings that each contain a circular air compression bore with a decreasing circumference that increases the velocity of air flow by funneling the air flow through the bore, where the turbine housings a connected together to form a bank of housings;

multiple airfoil blades with an external end of each blade attached to the interior of the circular air compression bores;

a central hub connected to the interior end of each blade, where the airfoil blades rotate around the central hub;

a drive shaft that extends from the central hub such that it rotates as the central hub turns; and an electric generator that is powered by the drive shaft, comprising a series of alternating stators and rotors configured along said drive shaft, said series of rotors comprising an initial rotor, a first main rotor, and a second main rotor, and said series of stators comprising a first stator between said initial rotor and first main rotor, and a second stator between said first main rotor and second main rotor, and wherein said first and second main rotors comprise a plurality of axially aligned opposing magnet pockets on each side of the first and second main rotors, each of the opposing magnet pockets containing an axially aligned magnet, and wherein the axially aligned magnets in the magnet pockets are oriented such that opposing magnetic poles face each other, wherein the two axially aligned magnets of the first main rotor and the two axially aligned magnets of the second main rotor create a magnetic flux in the second stator when rotated about the drive shaft.

* * * * *